United States Patent [19]
Braatz et al.

[11] Patent Number: 5,612,800
[45] Date of Patent: Mar. 18, 1997

[54] LCLV HAVING PHOTOCONDUCTIVE PEDESTALS EACH HAVING A CROSS-SECTIONAL AREA NO GREATER THAN 5 PERCENT OF THE AREA OF ITS RESPECTIVE REFLECTIVE PAD

[75] Inventors: Paul O. Braatz, Calabasas; Chiung-Sheng Wu, Los Angeles, both of Calif.

[73] Assignee: Hughes Aircraft Company, Los Angeles, Calif.

[21] Appl. No.: 333,533

[22] Filed: Nov. 2, 1994

[51] Int. Cl.$^6$ .......................... G02F 1/135; G02F 1/1335
[52] U.S. Cl. .................... 349/27; 349/30; 349/95
[58] Field of Search ..................... 359/72, 71, 40, 359/41

[56] References Cited

U.S. PATENT DOCUMENTS

| | | | |
|---|---|---|---|
| 4,790,632 | 12/1988 | Miyakawa et al. | 359/72 |
| 4,826,300 | 5/1989 | Efron et al. | 359/71 |
| 4,913,531 | 4/1990 | Efron et al. | 359/72 |
| 5,052,783 | 10/1991 | Hamada | 359/40 |
| 5,076,670 | 12/1991 | Sayyah | 359/72 |
| 5,081,542 | 1/1992 | Efron et al. | 359/72 |
| 5,140,448 | 8/1992 | Bone et al. | 359/72 |
| 5,220,445 | 6/1993 | Takenaka et al. | 359/72 |
| 5,328,853 | 7/1994 | Huber et al. | 437/3 |

FOREIGN PATENT DOCUMENTS

| | | | |
|---|---|---|---|
| 57150821 | 9/1982 | Japan . | |
| 4082269 | 3/1992 | Japan . | |
| 5-45673 | 2/1993 | Japan | 359/72 |
| 89/02613 | 3/1989 | WIPO | 359/72 |

OTHER PUBLICATIONS

Lewis, M.F. and Wilson, R.A. "*The Use of Lenslet Arrays in Spatial Light Modulators*" Pure and Applied Optics, 1994, pp. 143–150. (No Month).

Sterling et al., "Video–Rate Liquid Crystal Light–Valve Using an Amorphous Silicon Photodetector", *SID '90 Digest*, Paper No. 17A.2, pp. 327–329 (1990). (No Month).

*Primary Examiner*—Anita Pellman Gross
*Assistant Examiner*—Toan Ton
*Attorney, Agent, or Firm*—V. D. Duraiswamy; W. K. Denson-Low

[57] ABSTRACT

A liquid crystal light valve is provided with an array of photoconductive pedestals surrounded by a dielectric matrix material. Metal mirror pads are formed on top of each pedestal to form a high resolution metal matrix mirror, with each pedestal/mirror combination servicing one image pixel. The dielectric matrix forms a potential barrier between the individual photoconductive pedestals which prevents lateral charge migration between pedestals. The metal matrix mirror also shields the underlying photoconductive pedestal from photoactivation by the readout beam. The dielectric matrix material has a lower dielectric constant than the photoconductive pedestals, allowing the impedance of the photoconductive pedestals to match the impedance of the liquid crystal layer with a much thinner layer of photoconductive material than in prior LCLVs using a continuous photoconductive layer. The thinner photoconductive layer results in higher electric fields which improve the LCLV's response time, photodegradation rate, spatial resolution and spectral response.

10 Claims, 3 Drawing Sheets

LCLV HAVING PHOTOCONDUCTIVE PEDESTALS EACH HAVING A CROSS-SECTIONAL AREA NO GREATER THAN 5 PERCENT OF THE AREA OF ITS RESPECTIVE REFLECTIVE PAD

BACKGROUND OF THE INVENTION

1. Field of the Invention

This invention relates to liquid crystal light valves (LCLVs) and more specifically to light valves with high photosensitivity and spatial resolution.

2. Description of the Related Art

Liquid crystal light valves (LCLVs) are optical-to optical image transducers that are capable of accepting a low intensity light image and converting it, in real time, into an output image with light from another source. LCLVs have been utilized in a variety of military and commercial large screen graphics applications.

Prior LCLVs, such as the Hughes Liquid Crystal Light Valve described by Rodney D Sterling et al., "Video-Rate Liquid Crystal Light-Valve Using an Amorphous Silicon Photodetector", SID '90 Digest, Paper No. 17A.2, pages 327–329 (1990), use a thick, continuous and uniform layer of amorphous silicon (a-Si) as the photosubstrate with a liquid crystal layer attached to the a-Si photosubstrate. A dielectric mirror is located between the photosubstrate and the liquid crystal layer to reflect the readout beam after it has travelled through the liquid crystal layer and a CdTe light blocking layer is located between the dielectric mirror and the photosubstrate to prevent the readout beam from activating the photosubstrate.

In operation, an AC voltage is applied across the photosubstrate and liquid crystal layer. An input image beam is directed to the input side of the device, while a readout beam impinges on and is reflected from the readout side of the device. The input image beam activates the photosubstrate and reduces the resistivity of the photosubstrate at the area of activation. This, in turn, modulates the voltage across a corresponding area on the liquid crystal layer. Through this effect, the spatial intensity pattern of the input image is converted into a spatial variation in the voltage across the liquid crystal layer which, in turn, results in a spatial variation in the orientation of the liquid crystal molecules. The liquid crystal orientation relative to the readout light polarization at any given location determines the amount of readout light that will be reflected from the light valve at that location. Thus, as the readout beam passes through the liquid crystal layer, it becomes spatially modulated in accordance with the spatial modulation of the liquid crystal orientation.

Ideally, one wants to maximize the amount of voltage that is applied to the liquid crystal layer in response to a resistivity change in the a-Si photoconductive layer. This condition is achieved when the impedances of the liquid crystal layer and the a-Si layer (with no light) are matched. Prior LCLVs achieve this condition by making the a-Si layer very thick (approximately 30 microns). Larger thicknesses are required to match the impedances because the dielectric constant of the a-Si is higher than that of the liquid crystal layer. As the a-Si layer is made thicker, the distance between the electrodes on the input and readout side of the device is increased. This results in a smaller electric field across the liquid crystal and a-Si layers which reduces the response time, spatial resolution, and spectral response of the device. In addition, deposition times of about 30 hours are required to deposit a 30 micron a-Si layer, resulting in increased manufacturing costs.

Another problem is that the thick a-Si layer induces stress on the glass substrate on which the LCLV is typically fabricated on. This stress warps the glass substrate and results in the need for difficult and time consuming polishing procedures to achieve an optically flat surface. The high stress levels also prevent the use of fiber optic substrates which are needed in laser-eye-protection goggles and other display products.

LCLVs also suffer from "charge spreading". In an ideal LCLV, the lateral resistivity of the a-Si layer is high enough to prevent photogenerated charge from migrating in a lateral direction. If charge is allowed to spread laterally in the a-Si layer, then a portion of an input image at one location on the a-Si layer will spread to adjacent locations, resulting in reduced spatial resolution. Prior LCLVs attempt to overcome this problem by increasing the resistivity of the a-Si layer through the use of dopants. A p-type dopant such as boron is added to the a-Si layer to compensate for naturally occurring n-type dopants in the a-Si. This approach is very difficult because one must exactly compensate for the n-type dopants found in the a-Si for this technique to be effective. To complicate matters further, the amount of naturally occurring n-type dopants in the a-Si can change between deposition runs. This difficult counterdoping process results in increased manufacturing costs and lower yields.

The light-blocking CdTe layer found in prior LCLVs is needed to prevent any readout light that leaks through the dielectric mirror from entering the a-Si layer and overwhelming the spatially resolved input image. This CdTe layer has an intrinsic photoconductivity that may also contribute to charge spreading and a corresponding degradation in the spatial resolution of the output image. In addition, since CdTe is a toxic material, additional handling and disposal costs are incurred which add to the overall manufacturing costs of the LCLV.

SUMMARY OF THE INVENTION

In view of the above problems, the present invention seeks to lower the manufacturing costs and improve the performance of LCLVs by significantly reducing the total photoconductive layer deposition time, by increasing the electric field across the photosubstrate, by eliminating the CdTe light-blocking layer, by simplifying the substrate polishing procedure, and by an improvement in device yields resulting from the lower levels of mechanical stress and from the elimination of the difficult boron counterdoping process.

These goals are achieved with a new pedestal LCLV in which the continuous photoconductive substrate (photosubstrate) is replaced with a segmented, electrically isolated array of photoconductive pedestals embedded in a low dielectric constant matrix material. The pedestals are configured so that there is one pedestal per image pixel. The effective dielectric constant of the photosubstrate is lowered because the photoconductive pedestals are surrounded by a heterogenous low dielectric constant matrix. Because of the reduced effective dielectric constant, the impedance of the photosubstrate can be matched to the impedance of the liquid crystal layer with photoconductive pedestals that are much thinner than the prior continuous photosubstrates.

The photosubstrate manufacturing costs are reduced as a result of the proportionally shorter deposition times needed to obtain the thinner photoconductive films. In addition, the array of thinner, mechanically isolated photoconductive pedestals exhibits less mechanical stress which allows the LCLV to be fabricated on fiber optic substrates with greater yields and makes the complex polishing process now used to correct for warped glass substrates much simpler.

The thinner photosubstrate thickness used in the present invention also results in 10 to 25 times higher electric fields in the photosubstrate than in previous LCLVs because of the shorter distance between the input and counter-electrodes. This improves the response time, photodegradation rate, spatial resolution and spectral response of the LCLV because the higher electric fields increase the rate at which photo-generated charge is swept out of the photosubstrate bulk relative to the rate at which the charge pairs recombine.

In addition, because the photoconductive pedestals are dielectrically isolated between individual pixels, the charge spreading problem observed in prior LCLVs will be greatly reduced or eliminated without the use of the difficult boron counterdoping procedure.

Another object of the invention is the elimination of the CdTe light-blocking layer (LBL) found in prior LCLVs. The elimination of the LBL further reduces manufacturing costs, and improves spatial resolution and photosensitivity by eliminating one of the locations where charge spreading can take place.

These and other features and advantages of the invention will be apparent to those skilled in the art from the following detailed description of preferred embodiments, taken together with the accompanying drawings, in which:

DETAILED DESCRIPTION OF THE INVENTION

The present invention solves the problems described above by providing an LCLV with a segmented, electrically isolated array of a-Si pedestals embedded in a low dielectric constant matrix material. The a-Si pedestals form photoconductive paths between the input electrode and the liquid crystal layer and the dielectric matrix forms a potential barrier to the migration of charge between the pedestals. The dielectric matrix also lowers the effective dielectric constant of the photosubstrate, which allows the photosubstrate to be impedance matched with the liquid crystal layer using thinner layers of photoconductive material. The thinner photoconductive layer results in a smaller gap between the input and counter-electrodes. This in turn produces higher electric fields across the liquid crystal layer and photoconductive layer, which improves the response time, photodegradation rate, spatial resolution and spectral response of the LCLV. Furthermore, because the a-Si pedestals are electrically isolated from each other by the dielectric matrix, the charge spreading problem observed in prior LCLVs will be greatly reduced or eliminated without the use of difficult counterdoping procedures.

Figure 1:
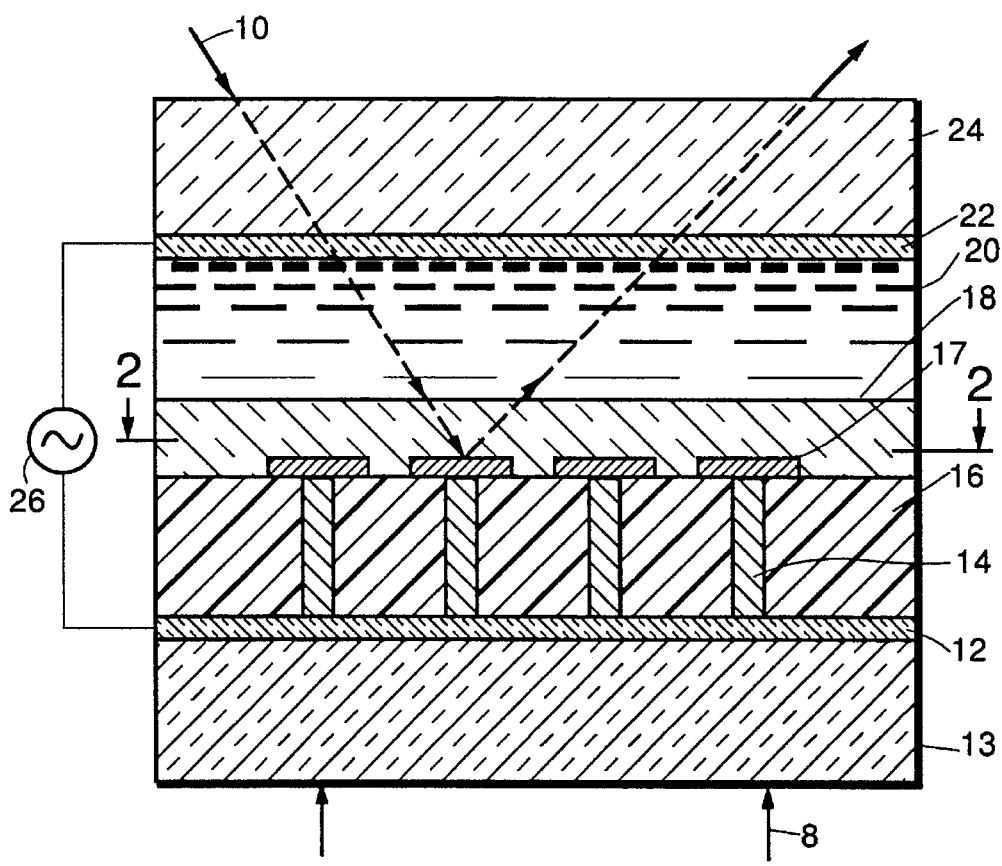
FIG. 1 is a sectional view of an a-Si pedestal LCLV constructed in accordance with the invention.

One embodiment of the invention is shown in FIG. 1. An input image beam 8 is directed to the input side of the device, while a readout beam 10 impinges on and is reflected from the readout side of the device. A first transparent electrode 12, such as indium tin oxide (ITO), is deposited on a glass substrate 13. An array of a-Si photoconductive pedestals 14 are embedded in a heterogenous low dielectric constant matrix material 16 and extend from the first electrode 12 towards the readout side of the device. The pedestals 14 are preferably 4 to 5 microns thick. The dielectric matrix material 16 is preferably $SiO_2$, which can be ion sputtered, but may also be any other low dielectric constant material such as polyimides, $SiN_x$, BN, BeO or diamond-like carbon. The primary requirement of the dielectric matrix material is that it have a low dielectric constant relative to a-Si (which has a dielectric constant of 12.7–13.0) and that it be configurable into an array of isolated pedestals 14, either by direct photolithography or by subsequent replication using a separate photoresist and etching step. The dielectric matrix material 16 must also be able to withstand the moderately harsh chemical and thermal environment associated with the a-Si plasma deposition process without eroding the a-Si pedestals 14, without contaminating the a-Si in the pedestal regions and without delaminating during the a-Si removal process.

The a-Si pedestals 14 are physically and electrically isolated from each other by the dielectric matrix material 16 and protected from the readout beam 10 by metal mirror pads 17. The mirror pads 17 form a metal-matrix mirror which helps to reflect the readout beam 10. Each pedestal/mirror pad combination represents one image pixel. Therefore, the cross-sectional areas of the pedestals 14 and mirror pads 17 can vary depending on the resolution desired. In addition, other factors such as the dielectric constant of the insulating matrix 16 and the dark resistivity of the a-Si film can influence the dimensions of the a-Si pedestals 14. In general, it is preferable to minimize the effective dielectric constant of the dielectric matrix/a-Si pedestal combination and to minimize the pedestal 14 cross-sectional area in order to reduce the thickness of the a-Si pedestal 14 required to achieve a particular switching ratio (the ratio of the electric current present in the a-Si with light to the electric current present without light).

Figure 2:
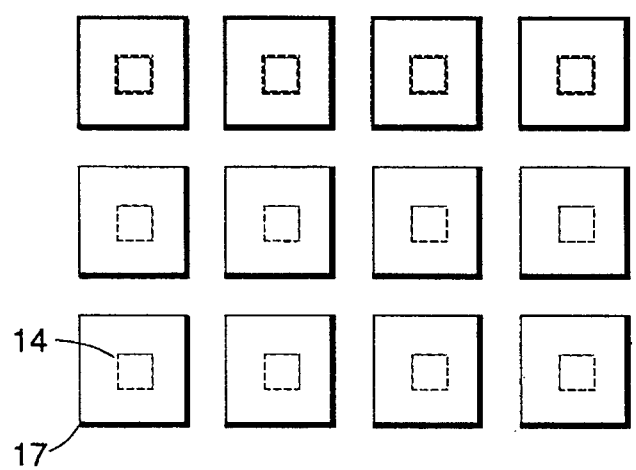
FIG. 2 is a sectional view taken along the section line 2—2 of FIG. 1.

A plan view of the pedestal/mirror pad combinations is shown in FIG. 2. For a typical device, the a-Si pedestals 14 are square and 4 microns on a side, the mirror pads 17 are square and 18 microns on a side and the center-to-center spacing between pedestals 14 is 20 microns. The pads 17 are elevated to the electric potential of their respective pedestals 14, and establish the image pixels.

Referring back to FIG. 1, a dielectric mirror 18 is fabricated on top of the metal pads 17 and dielectric matrix 16. The dielectric mirror 18 is preferably about 2 microns thick. It helps to reflect the readout beam 10 and also prevents the readout light 10 from entering the dielectric matrix 16 through the open regions between the metal mirror pads 17. Such stray light could otherwise be scattered by the dielectric matrix 16 into the sides of the a-Si pedestals 14, which would result in inadvertent activation of the pedestals 14. The dielectric mirror 18 and the mirror pads 17 replace the CdTe light blocking layer used in prior LCLVs that was difficult to handle and also degraded the LCLV's performance.

The liquid crystal layer 20 resides between the dielectric mirror 18 and a second ITO electrode 22. A glass plate 24 is attached to the second electrode 22.

In operation, an AC voltage source 26 applies a voltage across the liquid crystal layer/a-Si layer combination through the ITO electrodes 12 and 22. When no writing light is impinging on the input side of the a-Si pedestals 14, the voltage drop is primarily across the a-Si pedestals 14 and matrix material 16 rather than the liquid crystal layer 20 due to the high resistivity of the a-Si pedestals 14 and matrix material 16. When an area on the input side of an a-Si pedestal is activated by input light, electron-hole pairs are generated and swept by the electric field in the a-Si pedestal 14 towards the input and readout ends of the a-Si pedestal 14. The generation of electron-hole pairs lowers the resistivity of the a-Si pedestal 14 at the activation location. As a result, the AC voltage is applied to a corresponding location on the liquid crystal layer 22.

Through this effect, the spatial intensity pattern of the input image is converted into a spatial variation in the voltage across the liquid crystal layer 22 which, in turn, results in a spatial variation in the orientation of the liquid crystal molecules. The liquid crystal orientation relative to the readout light polarization at any given location determines the amount of readout light that will be reflected from the light valve at that location. Thus, as the readout beam 10 passes through the liquid crystal layer, it becomes spatially modulated in accordance with the spatial modulation of the liquid crystal orientation.

Figure 3:
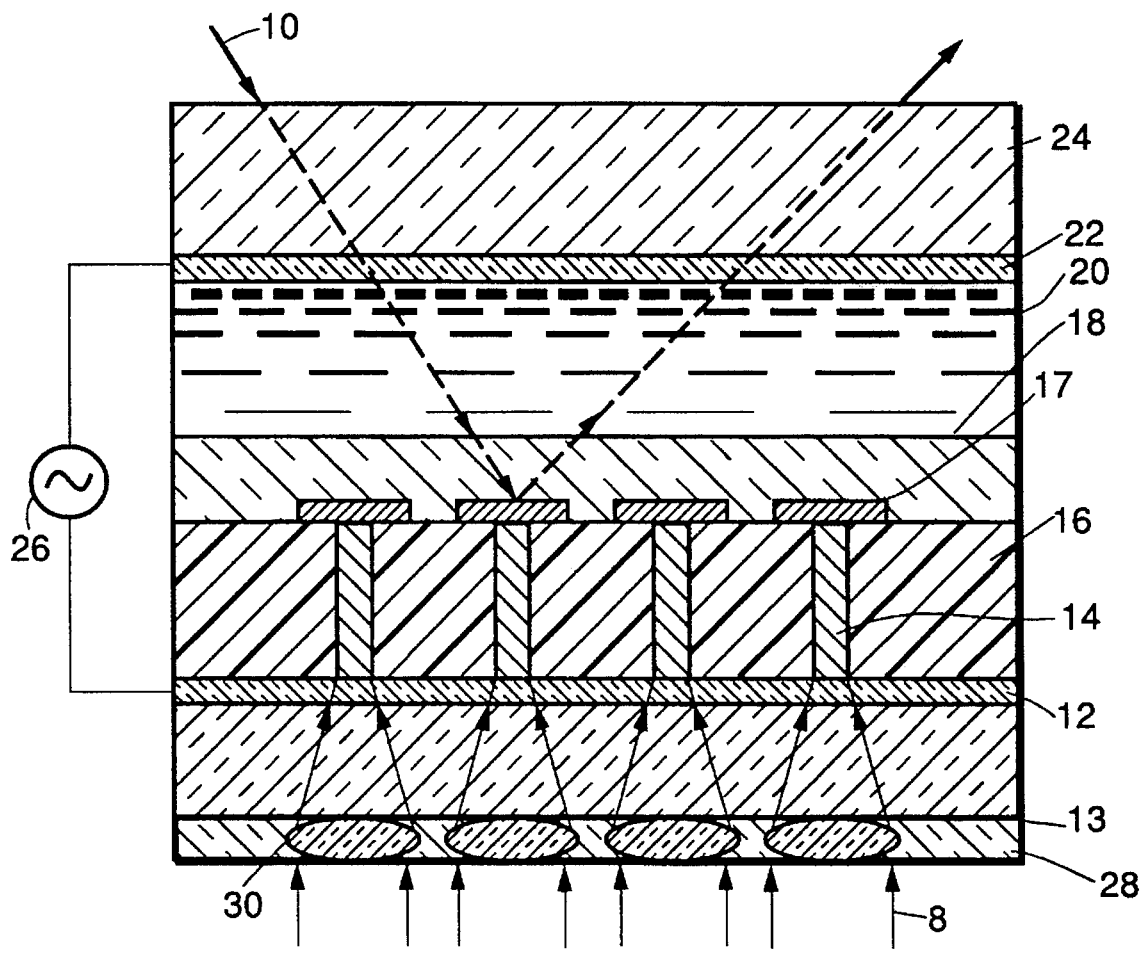
FIG. 3 is a sectional view showing an a-Si pedestal LCLV embodiment that incorporates a lens array.

FIG. 3 shows an alternate and more preferred embodiment in which a microlens array 28 is attached to the glass substrate 13 with optical cement (not shown). The lens array 28 contains one microlens 30 for each a-Si pedestal 14. The lenses 30 improve the photosensitivity of the device by collecting the part of the imaging beam 8 which would otherwise fall outside a pedestal 14 area and directing this light into the a-Si pedestal 14. In the ideal case of a perfect photoconductor, the lens array 28 will increase the photosensitivity of the device by the ratio of the lens 30 area to the pedestal 14 area. The microlens array is preferably formed using refractive optics, but may also be formed with binary gratings.

Figure 4A:
FIG. 4a–4i are cross-sectional views illustrating successive steps in the formation of the ITO input electrode, the a-Si pedestals, the metal matrix mirror and the dielectric mirror for an a-Si pedestal LCLV structure.
Figure 4B:
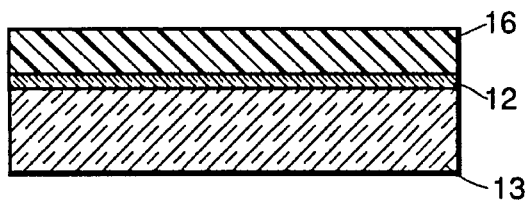
Figure 4C:
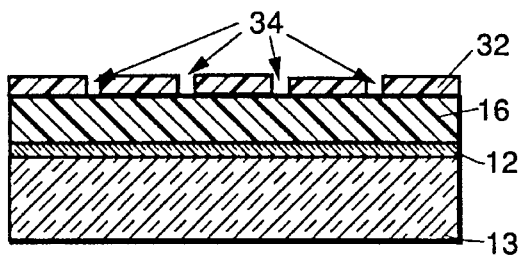

The preferred fabrication method for the pedestals is illustrated in FIGS. 4a–4i. Initially, as shown in FIG. 4a, a layer of indium tin oxide 12 is deposited on a glass substrate 13, preferably 3.5 inches thick, using standard ion beam sputtering techniques. The ITO layer 12 is preferably deposited to a thickness of 0.04 microns.

In the next step (FIG. 4b), the dielectric matrix material 16 (preferably $SiO_2$) is ion beam sputtered onto the ITO layer. The thickness of this layer is equal to the thickness of the eventual a-Si pedestals, and is preferably 4 to 5 microns.

The next step (FIG. 4c) consists of laying down a layer of photoresist 32, preferably 1 to 2 microns thick, over the dielectric matrix material 16, exposing it by standard photolithographic techniques and washing it away to leave isolated holes 34 in the photoresist 32 that establish the location of the eventual pedestals.

Figure 4D:
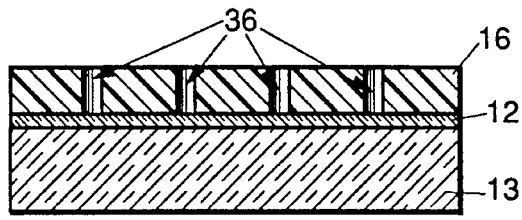
Figure 4E:
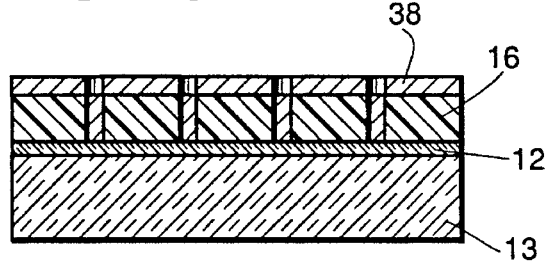
Figure 4F:
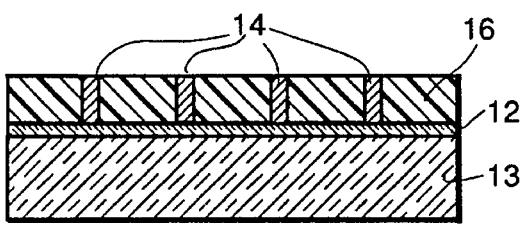

The dielectric matrix material 16 is then etched through the holes 34 in the photoresist 32 with either plasma etching or wet chemical etching techniques to form similar holes 36 in the matrix material 16. The remainder of the matrix material is protected from the etchant by the photoresist 32, which is removed after the formation of the holes 36 in the matrix material 16. Etching the holes 36 exposes the underlying portions of the ITO layer 12. The resulting structure is shown in FIG. 4d.

In the next two steps (FIGS. 4e–4f), an a-Si layer 38 is deposited using well known plasma-enhanced chemical vapor deposition techniques. Enough a-Si is deposited to fill the holes 36 in the matrix material 16. The excess a-Si 38 is then mechanically polished away, leaving behind the a-Si pedestals 14. The matrix material 16 and pedestals 14 are polished to achieve an optically flat surface.

Figure 4G:
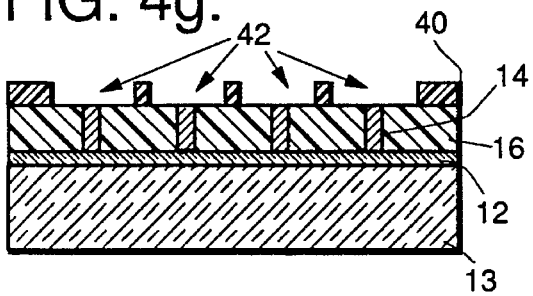

Next, as shown in FIG. 4g, a second layer of photoresist 40 is laid down, patterned and washed away to leave pad openings 42 in the photoresist 40.

Figure 4H:
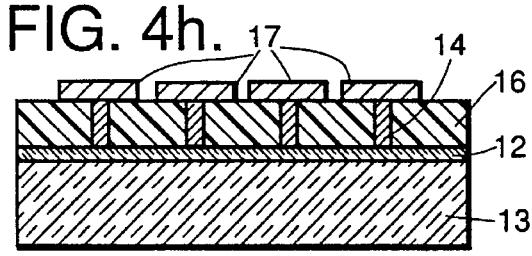
Figure 4I:
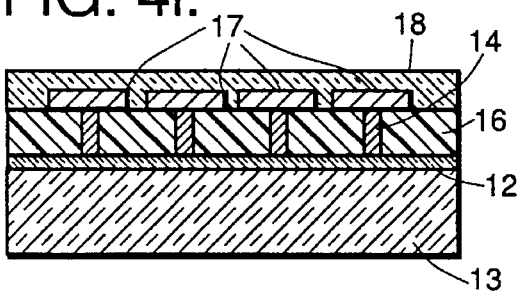

In FIG. 4h metal, preferably aluminum, is deposited in the openings 42 in the photoresist mask, preferably to a thickness of 0.1 to 0.4 microns. The photoresist mask is then washed away, leaving behind isolated metal-mirror pads 17 on top of the individual a-Si pedestals 14. Finally, as shown in FIG. 4i, a dielectric mirror 18 is deposited, preferably to a thickness of 2 microns.

While several illustrative embodiments of the invention have been shown and described, numerous variations and alternate embodiments will occur to those skilled in the art. For example, the photoconductive pedestals could be made out of other types of photoconductive material. Such variations and alternate embodiments are contemplated, and can be made without departing from the spirit and scope of the appended claims.

We claim:

1. A liquid crystal light valve (LCLV) having an input side for receiving an input light beam and a readout side for receiving a readout light beam, comprising:

a transparent input electrode, a low dielectric constant photosubstrate on the readout side of said input electrode, said photosubstrate comprising a layer of dielectric material on the readout side of said input electrode and a plurality of photoconductive pedestals extending through said dielectric material, said dielectric material having a dielectric constant lower than the dielectric constant of said photoconductive pedestals, thereby lowering the effective dielectric constant of said photosubstrate, a liquid crystal (LC) layer on the readout side of said dielectric material, said photosubstrate having a thickness sufficient to impedance match it to said LC layer, with said dielectric material reducing the photosubstrate thickness required to impedance match it to said LC layer respective electrically conductive and optically reflective pads extending over said pedestals between said dielectric material and said LC layer, said pads forming an array of pixels for reflecting said readout beam from the underlying photoconductive pedestals, and a transparent counter-electrode on the readout side of said LC layer, said input and counter-electrodes being adapted to receive and to apply an electrical potential across said LC layer and said photoconductive pedestals, each of said photoconductive pedestals having a cross-sectional area no greater than approximately 5 percent of the cross-sectional area of its respective pad, and responding to said input light beam to spatially modulate the potential across said LC layer in accordance with the spatial characteristics of said input beam, said dielectric material surrounding said pedestals to form potential barriers to the migration of charge between said pedestals.

2. The LCLV of claim 1, wherein said pads comprise a metal matrix mirror.

3. The LCLV of claim 1, further comprising a dielectric mirror between said pads and said LC layer and between said dielectric material and said LC layer, said dielectric mirror further reflecting said readout beam from the underlying photoconductive pedestals.

4. The LCLV of claim 1, further comprising a focuser for dividing said input beam into a plurality of image pixels and for focussing each of said image pixels onto a respective photoconductive pixel.

5. The LCLV of claim 4, wherein said focuser comprises:
   a layer of transparent material on the input side of said input electrode, and
   a lens array on the input side of said transparent material, each lens of said lens array focussing respective portions of an input beam to respective pedestals.

6. The LCLV of claim 1, wherein said input and counter-electrodes are formed from indium tin oxide.

7. The LCLV of claim 1, wherein said photoconductive pedestals are formed from amorphous silicon.

8. The LCLV of claim 1, wherein said photoconductive pedestals comprise amorphous silicon and said low dielectric constant material comprises $SiO_2$.

9. The LCLV of claim 8, wherein said pedestals have a square-shaped cross-section with lateral sides that are approximately 4 microns long and wherein the center-to-center spacing between adjacent pedestals is approximately 20 microns.

10. The LCLV of claim 9, wherein said pads have a square-shaped cross-section with lateral sides that are approximately 18 microns long.

* * * * *